(12) United States Patent
Berthereau et al.

(10) Patent No.: US 8,298,973 B2
(45) Date of Patent: Oct. 30, 2012

(54) RADIO-OPAQUE GLASS FIBRES AND DENTAL PROSTHETIC MEMBER CONTAINING SAID FIBRES

(75) Inventors: Anne Berthereau, Challes les Eaux (FR); Jerome Blaizot, Grenoble (FR)

(73) Assignee: Societe de Recherches Techniques Dentaires—R.T.D., Saint Egreve (FR)

( * ) Notice: Subject to any disclaimer, the term of this patent is extended or adjusted under 35 U.S.C. 154(b) by 493 days.

(21) Appl. No.: 12/674,723

(22) PCT Filed: Aug. 28, 2008

(86) PCT No.: PCT/FR2008/051536
§ 371 (c)(1),
(2), (4) Date: Feb. 23, 2010

(87) PCT Pub. No.: WO2009/030859
PCT Pub. Date: Mar. 12, 2009

(65) Prior Publication Data
US 2011/0045440 A1 Feb. 24, 2011

(30) Foreign Application Priority Data
Aug. 28, 2007 (FR) ..................... 07 57212

(51) Int. Cl.
| C03C 3/078 | (2006.01) |
| C03C 3/083 | (2006.01) |
| C03C 3/085 | (2006.01) |
| C03C 3/087 | (2006.01) |
| C03C 4/08  | (2006.01) |
| C03C 13/00 | (2006.01) |
| C03C 13/02 | (2006.01) |
| A61C 13/30 | (2006.01) |
| B32B 17/04 | (2006.01) |
| B32B 17/00 | (2006.01) |

(52) U.S. Cl. ............ 501/38; 501/69; 501/70; 501/72; 106/35; 523/115; 433/201.1; 433/212.1; 433/220; 433/228.1

(58) Field of Classification Search .............. 501/38, 501/69, 70, 72; 106/35; 523/115; 423/201.1, 423/212.1, 220, 228.1
See application file for complete search history.

(56) References Cited

U.S. PATENT DOCUMENTS
| 6,012,924 A | 1/2000 | Reynaud et al. |
| 6,686,304 B1 * | 2/2004 | Wallenberger ............ 501/35 |
| 2005/0209086 A1 | 9/2005 | Sugawara et al. |
| 2007/0042172 A1 | 2/2007 | Zguris et al. |

FOREIGN PATENT DOCUMENTS
| EP | 0 432 001 A1 | 6/1991 |
| EP | 0 500 325 A1 | 8/1992 |
| EP | 0 895 774 A2 | 2/1999 |
| WO | WO 96/15759 A1 | 5/1996 |
| WO | WO 01/08590 A1 | 2/2001 |

OTHER PUBLICATIONS

International Search Report, dated Mar. 10, 2009, from corresponding PCT application.

* cited by examiner

*Primary Examiner* — Carol M Koslow
(74) *Attorney, Agent, or Firm* — Young & Thompson

(57) ABSTRACT

A glass thread adapted for reinforcing polymeric materials includes a plurality of filaments having a chemical composition that includes the following constituents within the limits defined below in weight percent:

| $SiO_2$ | 40 to 60 |
| $Al_2O_3$ | 0 to 5 |
| CaO | 1 to 15 |
| MgO | 1 to 15 |
| BaO | 2 to 15 |
| SrO | 12 to 20 |
| ZnO | 0.5 to 10 |
| $Na_2O + K_2O + Li_2O$ | 0 to 5 |
| $TiO_2$ | 3 to 20 |

Prosthetic members including such threads are also described.

13 Claims, No Drawings

RADIO-OPAQUE GLASS FIBRES AND DENTAL PROSTHETIC MEMBER CONTAINING SAID FIBRES

This invention concerns glass fibres or threads, said threads being producible using a method consisting in mechanically drawing streams of molten glass through orifices in the base of an extrusion die, usually heated using the Joule effect.

It more particularly concerns glass threads having properties for absorbing ionising radiation, notably X rays, thanks to their particularly advantageous novel composition.

The novel glass fibres in the invention have a particularly advantageous application in the dental field, notably as the constituent fibres in prosthetic members. The prosthetic members for the purposes of the invention cover two types of products. The first concerns products manufactured by machining sections or rods made of glass fibres embedded in a resin matrix, notably such as dental posts, intradentinal posts, splinting, and CAD/CAM preforms. The second concerns glass fibres woven to form a strip which is then impregnated with a resin. These strips, known in the dental field as "prepregs", can also be used as bridge reinforcements or "splints". In practice, the resin impregnating the prepregs is polymerised by the dentist or orthodontist using light curing.

The invention is more particularly described in relation to dental posts made of a composite material even though, as previously indicated, it can be applied to all the prosthetic members listed above.

Dental posts are used to reconstitute pulpless teeth. A distinction is made between two types of posts, metal or ceramic posts and composite posts, respectively.

Metal posts are usually made of stainless steel. Their main disadvantage lies in their being subject to corrosion. Furthermore, they have a transverse modulus of elasticity that differs from that of dentine, leading over time to separation of the post.

To solve these problems, posts made with composite materials have been proposed, such as those described in the Applicant's document EP-A-0 432 001. These posts are, in practice, made of long, unidirectional glass or carbon fibres embedded in a biocompatible resin matrix. In general, the proportion of long fibres, whatever the material selected, represents 40 to 80% of the post by volume, the supplement to 100% being occupied by the matrix.

The main disadvantage of the posts described in this document is that they are not radio-opaque against X rays, which makes their positioning difficult to establish precisely when they are put in place or if they are accidentally swallowed.

To solve the radio-opacity problem, document EP-A-0 793 474 proposed incorporating metal oxide into the matrix. A list of usable metal oxides is given, the choice of which is made depending on their refraction index. Although the metal oxides provide radio-opacity to the post, the oxides sometimes form agglomerates in the matrix, thus increasing its viscosity and making it hard to produce the rod. Furthermore, as the post has to provide high mechanical strength, it must contain a large volume of reinforcing fibres (in practice, 40 to 80%), thus reducing the volume available for the metal oxides. This necessarily limits the level of radio-opacity.

Document EP-A-0 895 774 describes reinforcing materials for dental restoration in which metal oxides are incorporated directly into the glass fibre. Among the fibres illustrated in said document, the so-called AR glass fibre is more particularly well known, the radio-opaque metal it contains being zirconia ($ZrO_2$) at a content between 1 and 20% by weight. To the best of the Applicant's knowledge, as of the date of filing of the present application, this is the only fibre used in dentistry for its radio-opacity properties. One of the disadvantages of this fibre, however, is its mechanical strength, which is weaker than, for example, that of E glass fibre, also listed in the aforementioned document. As it is not radio-opaque, E glass fibre is not used for this property. Another disadvantage of AR glass fibre lies in its level of radio-opacity, which is not clinically satisfactory. Notably, depending on the type of tooth root to be reconstituted, the post can sometimes be confused with the dentine on X-ray images, especially when the thickness of the dentinal wall is 2 to 3 mm. Diagnosis then becomes difficult when the practitioner tries to re-examine his/her previous intervention. The level of radio-opacity is, however, sufficient for identifying accidental swallowing of a post. Another disadvantage of AR glass fibre lies in its high refraction index, approximately 1.56. Consequently, to obtain a translucent post, the refraction index of the matrix has to be increased accordingly as indicated in document W0-01/08590, which necessarily limits the choice of its components. Lastly, at a content exceeding 20% by weight, it appears that zirconium oxide is hard to mix with the other oxides present in the glass fibres, making fibre forming and, more generally, the production of these fibres, delicate operations.

The problem that the invention proposes to solve is therefore to develop fibres that are alternatives to AR glass fibres and their production method, i.e. a glass composition of which fibres can be drawn with a sufficient forming margin and whose mechanical and radio-opacity properties together are superior to those of AR glass fibres.

The "liquidus temperature", noted "$T_{liq}$", is the temperature at which the most refractory crystal appears in a system in thermodynamic balance. The liquidus temperature therefore gives the lower limit at which it is possible to draw fibres. The forming margin is defined as the difference between the temperature at which the glass's viscosity is 1000 Poises (100 Pa.s), temperature at which glass fibres are generally drawn, and the liquidus temperature. Advantageously, the forming margin is greater than 50° C.

Document US2007/0042172 describes glass compositions designed for use in batteries. Composition C-5 notably describes a composition whose sum of $Na_2O+K_2O+Li_2O$ is greater than 12, limiting devitrification and reducing the viscosity of the glass. Such a high alkaline oxide content, however, gives the fibre hydrophilic properties which can lead to water infiltration into the composite. Furthermore, the mere presence of $ZrO_2$ and $ZnO$ is not enough to impart radio-opacity properties to the fibre.

Document US2005/0209086 describes a glass composition used in the production of cathode ray tubes. Here again, the high proportion of $Na_2O$ and $K_2O$ imparts hydrophilic properties to the fibre which, when applied to the prosthetic members in the invention, can lead to water infiltration into the composite, affecting the mechanical properties of said prosthetic member over time.

The Applicant has managed to develop novel fibres, free of $ZrO_2$, which meet all the objectives proper to dental prosthetic members, which are:

mechanical strength, radio-opacity.

In other words, the subject of the invention is a glass thread comprising a plurality of filaments having a chemical composition that comprises the following constituents within the limits defined below, expressed in weight percent:

| | |
|---|---|
| SiO$_2$ | 40 to 60 |
| Al$_2$O$_3$ | 0 to 5 |
| CaO | 1 to 15 |
| MgO | 1 to 15 |
| BaO | 2 to 15 |
| SrO | 12 to 20 |
| ZnO | 0.5 to 10 |
| Na$_2$O + K$_2$O + Li$_2$O | 0 to 5 |
| TiO$_2$ | 3 to 20 |

Silica (SiO$_2$) is an oxide that is a vitreous network former and plays an essential role in stability. In the context of the limits defined above, when the percentage of this constituent is less than 40%, the glass obtained is not viscous enough and devitrifies too easily during fibre forming For contents exceeding 60%, the glass becomes viscous and harder to melt. The silica content is therefore preferably between 48 and 55%.

Alumina (Al$_2$O$_3$) is also a former of the vitreous network according to the invention, but it is nonetheless detrimental to its devitrification properties. The alumina content is therefore preferably between 3 and 4%.

Lime (CaO) and magnesia (MgO) are used to adjust viscosity and to control devitrification of the glasses according to the invention. They have a particularly appreciable melting effect in compositions with low alkaline oxide content. In the context of the limits defined according to the invention, a CaO content greater than or equal to 15% leads to an increase in devitrification speeds in CaSiO$_3$ (wollastonite) that is detrimental to good fibre forming The CaO content is preferably between 5 and 6%. The MgO content is preferably between 4 and 7%.

Barium oxide (BaO) and strontium oxide (SrO) are essential because their presence solves the technical problems behind this invention, and they also provide several other advantages. It has been observed that the presence of BaO and SrO imparts strong absorption of ionising radiation, notably X rays. The presence of these two oxides is essential as there is a synergistic effect between them which produces greater X-ray absorption when just one of these oxides is used. Barium is an atom that imparts one of the highest possible mass absorption coefficients for 40 keV or 60 keV of energy, whereas for 20 keV of energy, strontium absorbs more than barium and is one of the most absorbent atoms. The simultaneous presence of both atoms therefore provides strong absorption over a wide range of energies, in this case, the entire X-ray spectrum (from 100 eV to 100 keV).

Strontium oxide (SrO) provides the further advantage of increasing the toughness and the Young's modulus of fibres as well as improving the forming margin of the glass, thus making fibre forming easier. Barium oxide has the disadvantage, however, of increasing the glass's density.

For these different reasons, the BaO content is preferably greater than or equal to 5%, or even 6%, and/or less than or equal to 10%. In practice, it is between 5 and 8%. The SrO content is preferably greater than or equal to 9%, or even 10%, and/or less than or equal to 17%. In practice, it is between 12 and 16%.

To ensure the widest possible forming margin, the sum of the CaO, MgO, BaO and SrO contents is preferably greater than or equal to 23% or 25%, and even 27% or 30%.

Zinc oxide (ZnO) is essential in the context of the compositions according to the invention because it very sharply increases the forming margin. Glass that does not contain zinc oxide also presents undesirable demixing, which shows up as an opalescent appearance. It has also become apparent that this oxide imparts bacteriostatic properties, which is particularly advantageous in odontological applications. The ZnO content is therefore preferably greater than or equal to 1%, or even 2%, and/or less than or equal to 6%. In practice, it is between 2 and 5%.

Alkaline oxides (Li$_2$O, Na$_2$O, K$_2$O) can be added to the glass thread compositions according to the invention to limit devitrification and reduce the viscosity of the glass. The alkaline oxide content should, however, be kept less than or equal to 5% to avoid a detrimental reduction in the glass's hydrolytic resistance and forming margin. The Na$_2$O content is preferable greater than or equal to 1%. In practice, the Na$_2$O+K$_2$O+Li$_2$O content is between 1.5 and 2%.

Titanium oxide (TiO$_2$) is an essential component of the composition according to the invention. It notably improves mechanical strength and corrosion resistance, whether in an acid medium or an alkaline medium. Ultraviolet absorption due to high titanium content can, however, be prohibitive when the fibres are to be used to strengthen polymers whose cross-linking is achieved using UV radiation. Furthermore, titanium oxide tends to give a yellow colour to the fibre, which is a disadvantage for the dental applications covered by this Application. For these different reasons, the titanium oxide content in the glasses according to the invention is preferably less than 12%. In practice, it is between 5 and 10%.

One or more other components may also be present, generally as impurities, in the chemical composition of the threads according to the invention; the total content of these other components generally remains less than or equal to 5%, preferably less than 3%, or even 2%, with the level of each of these other components generally not exceeding 2% or 1%. These may notably include agents used to refine the glass (eliminating gas inclusions), such as sulphur, arsenic, halogens such as chlorine, or cerium oxide, or compounds from dissolution in the glass of small quantities of materials used as refractory materials in the glass melting furnace. These different impurities do not change how the previously described glass threads solve the technical problem behind the invention. This may also include compounds such as MnO, F, U$_2$O, Fe$_2$O$_3$, B$_2$O$_3$ and ZrO$_2$ whose quantity does not exceed 0.1% by weight in the composition.

The manganese oxide content (MnO or MnO$_2$) is preferably less than or equal to 1% and preferably less than or equal to 0.3%. As this oxide can give the glass a very intense purple colour, the MnO content is preferably kept at less than or equal to 0.1%, or 0.05% and even 0.01%.

Fluorine (F or F$_2$) can be added in small quantities to improve glass fusion, or may be present as an impurity. For reasons related to environmental protection, the fluorine content is advantageously kept below 1%, or even 0.5%, and notably less than 0.1%.

Iron oxide is an inevitable impurity in the glasses according to the invention due to its presence in several raw materials, and its content is usually less than 0.5%. Given that the colouring effect generally attributed to titanium is actually due to an electronic transfer between Fe$^{2+}$ and Ti$^{4+}$ ions, the iron content in the glasses according to the invention is advantageously less than 0.3%, and notably 0.2%, through a judicious choice of raw materials.

Boron oxide or boric anhydride (B$_2$O$_3$) may also be present in the composition according to the invention, generally at a content less than or equal to 3%, preferably 1%. The glass thread according to the invention preferably does not contain any B$_2$O$_3$.

Preferably, the sum of the fluorine, boron oxide and lithium oxide (F+B$_2$O$_3$+Li$_2$O) contents is less than or equal to 2%, or even 1%.

The glass threads according to the invention are generally obtained from glasses with the aforementioned composition according to the following method: multiple molten glass streams flowing through multiple orifices in the base of one or more extrusion dies are drawn in the form of one or more bundles of continuous filaments, then gathered into one or more threads collected on a moving support. This may be a rotating support if the threads are collected into packages or a translating support if the threads are cut by a part that is also used to draw them or when the threads are projected by a part used to draw them so as to form a mat.

The threads obtained, possibly after other processing operations, can thus be presented in different forms: continuous threads, chopped or ground threads, braids, ribbons, mats, netting, etc., said threads comprising filaments with diameters ranging approximately from 5 to 30 microns.

The molten glass feeding the extrusion dies is obtained using raw materials which may be pure (from the chemical industry, for example), but more often natural, the latter sometimes including trace impurities, these raw materials being mixed in the appropriate proportions to obtain the desired composition, and then melted. The temperature of the molten glass (and therefore its viscosity) is conventionally adjusted by the operator to allow glass fibre formation while notably avoiding the problems of devitrification and so as to obtain the best possible quality of glass threads. Before gathering them together into threads, the filaments are generally coated with a sizing composition to protect them from abrasion and to make it easier to incorporate them later into the materials to be reinforced.

As stated above, the glass threads in the invention are designed to constitute reinforcement fibres for various prosthetic members which are produced from rods comprising glass fibres embedded in a resin matrix, or produced from glass fibres impregnated with a matrix that can only be polymerised during the practitioner's intervention.

In the first case, this notably concerns dental posts, intradentinal posts, splinting or CAD/CAM preforms. In this case, the amount of glass fibres represents between 50 and 70% by volume, and advantageously between 60 and 68% by volume, of the prosthetic member.

The glass fibres impregnated with polymerisable resin, also called "prepregs", are woven before being impregnated to constitute bridge reinforcements called "splints".

The production methods for these different prosthetic members are well known to the person skilled in the art and consequently do not require any detailed description, nor does the choice of resins. More particularly concerning posts, we should simply point out that these can notably be produced by pultrusion.

The advantages offered by the glass threads according to the invention will be better understood through the following example, which illustrates the present invention without limiting it in any way.

EXAMPLE 1

Table 1 contains examples according to the invention.

The composition of the glasses is expressed in weight percentage of the oxides in the analysis. It may also contain some impurities whose content is less than 0.1%.

To illustrate the advantages of the glass compositions according to the invention, the table presents three fundamental properties:

the temperature corresponding to a viscosity of 103 poises (102 Pa.s), noted "T3", measured according to the ISO 7884-2 standard and expressed in degrees Celsius, close to the temperature of the glass in the extrusion die;

the forming margin, or difference between the "T3" temperature and the liquidus temperature, noted "delta T" and expressed in degrees Celsius.

TABLE 1

| Ex | 1 | 2 | 3 | 4 | 5 |
|---|---|---|---|---|---|
| $SiO_2$ | 54.5 | 48.7 | 53.0 | 50.8 | 53.8 |
| BaO | 6.5 | 6.0 | 6.0 | 7.0 | 6.0 |
| SrO | 13.0 | 14.0 | 13.0 | 13.0 | 12.0 |
| ZnO | 3.0 | 4.0 | 4.0 | 3.0 | 2.0 |
| $Al_2O_3$ | 3.7 | 3.7 | 3.7 | 3.7 | 3.7 |
| CaO | 5.4 | 5.4 | 5.4 | 6.0 | 6.0 |
| MgO | 5.4 | 6.7 | 5.4 | 6.0 | 7.0 |
| $TiO_2$ | 7.0 | 9.7 | 8.0 | 9.0 | 8.0 |
| $Na_2O$ | 1.2 | 1.2 | 1.2 | 1.2 | 1.2 |
| $K_2O$ | 0.5 | 0.5 | 0.5 | 0.5 | 0.5 |
| T3 (° C.) | 1185 | 1150 | 1165 | 1180 | 1180 |
| Liquidus T (° C.) | 1120 | 1100 | 1120 | 1125 | 1113 |
| Forming margin (in ° C.) | 65 | 50 | 45 | 55 | 67 |

EXAMPLE 2

This example aims to compare the radio-opacity of a rod containing AR glass fibres with that of a rod containing the fibres in the invention for variable fibre volumes.

Composition of the fibre in the invention in weight percentage:

|  | Target |
|---|---|
| $Na_2O$ | 1 |
| MgO | 5.4 |
| $Al_2O_3$ | 3.7 |
| $SiO_2$ | 53 |
| $K_2O$ | 0.5 |
| CaO | 5.4 |
| $TiO_2$ | 8 |
| ZnO | 4 |
| SrO | 13 |
| BaO | 6 |

AR rod: rod containing 64% vol of AR glass fibres
Rod I: rod containing 64% vol of fibres in the invention
Rod II: rod containing 66% vol of fibres in the invention
Rod III: rod containing 69% vol of fibres in the invention
A 100% radio-opacity value was attributed to the AR glass fibre.

| Radio-opacity set at 100% | Grade 1 | Grade 2 | Grade 3 | Grade 4 | Average |
|---|---|---|---|---|---|
| AR rod | 100 | 100 | 100 | 100 | 100% |
| Rod I | 129 | 126 | 143 | 146 | 136% |
| Rod II | 132 | 134 | 146 | 149 | 140% |
| Rod III | 139 | 131 | 152 | 156 | 145% |

As the table above shows, an increase in radio-opacity of between 36% and 45% on average is obtained with the fibres in the invention depending on the volume of fibres.

The invention claimed is:

1. Glass thread adapted for reinforcing polymeric materials and comprising a plurality of filaments having a chemical composition that comprises the following constituents within the limits defined below in weight percent:

| | |
|---|---|
| $SiO_2$ | 40 to 60 |
| $Al_2O_3$ | 0 to 5 |
| CaO | 1 to 15 |
| MgO | 1 to 15 |
| BaO | 2 to 15 |
| SrO | 12 to 20 |
| ZnO | 0.5 to 10 |
| $Na_2O + K_2O + Li_2O$ | 0 to 5 |
| $TiO_2$ | 3 to 20. |

2. Glass thread as claimed in claim 1, wherein the $SiO_2$ content is between 48 and 55%.

3. Glass thread as claimed in claim 1, wherein the CaO content is between 5 and 6%.

4. Glass thread as claimed in claim 1, wherein the MgO content is between 4 and 7%.

5. Glass thread as claimed in claim 1, wherein the BaO content is between 5 and 8%.

6. Glass thread as claimed in claim 1, wherein the SrO content is between 12 and 16%.

7. Glass thread as claimed in claim 1, wherein the sum of the CaO, MgO, BaO and SrO contents is greater than or equal to 23%.

8. Glass thread as claimed in claim 1, wherein the ZnO content is between 2 and 5%.

9. Glass thread as claimed in claim 1, wherein the $TiO_2$ content is between 5 and 10%.

10. Dental prosthetic member made of a composite material comprising the glass threads as claimed in claim 1, embedded in a resin.

11. Prosthetic member as claimed in claim 10, characterised in that it concerns dental posts, intradentinal posts, splinting or CAD/CAM preforms.

12. Prosthetic member as claimed in claim 10, characterised in that the fibres represent between 50 and 70% by volume of said prosthetic member.

13. Glass thread as claimed in claim 2, wherein the CaO content is between 5 and 6%.

* * * * *